United States Patent Office 2,713,061
Patented July 12, 1955

2,713,061
3-METHYL ANDROSTANES

Josef Kathol, Berlin-Charlottenburg, Germany, assignor to Schering A. G., Berlin, Germany, a corporation of Germany No Drawing. Application April 1, 1952,
Serial No. 279,957

Claims priority, application Germany April 6, 1951

9 Claims. (Cl. 260—397.4)

This invention relates to new steroid compounds, and more particularly to steroid compounds having a tertiary alcohol group at 3 position in their molecule, and to a method of making same.

One object of this invention is to provide new and valuable steroid compounds, such as compounds of the androstan and androstan series, which possess in 3-position a tertiary alcohol group and a saturated or unsaturated alkyl side chain.

A further object of this invention is to provide a method of making such new and valuable steroid compounds, such as compounds of the androstan and androstan series.

This invention consists in providing new steroid compounds which, in contrast to known steroid compounds, having a tertiary alcohol group in 17-position, possess antihormonal activity, i. e. an effect contrary to that of the ordinary sex hormones for instance, the male sex hormones of the androstan and androsten series. Said new compounds impede, for instance, growth and functioning of the germinal glands either directly or probably indirectly by influencing the pituitary gland.

Other objects of this invention will become apparent from the specification and the following examples.

It is very surprising that compounds of the steroid hormone series can be converted into compounds which have such an antagonistic effect, although they still possess the steroid ring structure. Thus, for instance, to produce especially valuable anti-hormones according to this invention, 3-keto steroid compounds of the androstan and androsten series, such as androstan-17β-ol-3-one, testosterone, androstan-17α-ol-3-one and their several esters are used as starting materials. The process according to this invention consists in principle in reacting said 3-keto compounds with organo-metal compounds, such as Grignard compounds, for instance alkyl magnesium iodide, lithium alkyl compounds, alkali acetylides, acetylene in the presence of alkali metals or alkali metal compounds, such as alkali amides, alkali alcoholates and the like.

Thereby the corresponding tertiary alcohols of said 3-keto androstan or androsten compounds are produced. Said new compounds have in 3-position the group

wherein R₁ is a saturated or unsaturated aliphatic hydrocarbon radical, and possess in 17-position a hydroxyl group, or a group convertible by hydrolysis into a hydroxyl group, such as an ester or ether group, or, preferably a keto group.

On reacting said 3-keto androstan or androsten compounds with alkali acetylides, there are obtained the corresponding 3-ethinyl-3-hydroxy androstan or androsten compounds. Said ethinyl compounds may be hydrogenated to the corresponding ethenyl and ethyl compounds.

When starting with a compound which contains in its molecule another keto group, besides the keto group in 3-position, it is necessary to protect said other keto group, in case it reacts more rapidly than or just as rapidly as the keto group in 3-position, against the action of the organo-metal compound, for instance, by converting said keto group into a group which subsequently may be reconverted into a keto group. Such groups are, for instance, the hydroxyl group, acyloxy groups, cyclic acetal groups.

The following examples serve to illustrate the present invention without, however, limiting the same to them.

Example 1

A solution of 2 g. of androstan-17β-ol-3-one-17-acetate in 75 cc. of ether is added drop by drop to an ethereal solution of methyl magnesium iodide, prepared from 2.2 g. of magnesium, 7.2 cc. of methyl iodide, and 45 cc. of ether. The mixture is heated to boiling for about 1½ hours. The reaction product obtained thereby is then decomposed by pouring the reaction mixture into 100 cc. of dilute hydrochloric acid (7.5%). That portion of the reaction product which, on account of its low solubility in ether, does not remain in solution therein is brought into solution by the addition of ca. 200 cc. of chloroform, the ether-chloroform solution is separated from the aqueous layer and is washed successively with water, dilute sodium thiosulfate solution (10%) and again with water.

The solvent mixture is then evaporated to dryness and the resulting residue is subjected to fractional crystallisation by means of ether, followed by recrystallisation of the different fractions from acetic acid ethyl ester, and methanol respectively. Thereby two isomeric compounds are obtained, namely 3b-methyl androstan-3a, 17β-diol, having a melting point of 194–195° C. and 3a-methyl androstan-3b, 17β-diol, having a melting point of 169–170° C.

The letters "a" and "b" indicate (in accordance with a proposal of Fieser and Fieser, "Natural products related to phenanthrene," 3rd edition 1949, Preface VI (3), that the hydrocarbon residues introduced into the starting material occupy opposite positions in the two stereo isomers which are arbitrarily distinguished by "a" and "b," but that said isomers have not yet been specifically assigned to the α- or the β- series.

0.92 g. of 3a-methyl androstan-3b,17β-diol are dissolved in 50 cc. of glacial acetic acid and are oxidized at room temperature, by adding thereto, while stirring, a solution of 0.27 g. of chromic acid in 2.7 cc. of 90% acetic acid. After oxidation has taken place the reaction mixture is stirred into 5% sodium hydroxide solution and the precipitated oxidation product is extracted by means of ether. The ether solution is evaporated to dryness. The crystalline residue yields, after recrystallisation from hexane, 3a-methyl androstan-3b-ol-17-one, having a melting point of 147–148° C.

Example 2

1.7 g. of testosterone propionate are reacted with methyl magnesium iodide, prepared from 1.8 g. of magnesium, 5.8 cc. of methyl iodide, and 75 cc. of ether, under the same conditions as described in Example 1. As soon as the reaction is complete, the reaction mixture is cooled to 0° C., is decomposed by pouring the same into 200 cc. of ammonium chloride solution saturated in the cold, the reaction product is extracted with ether and worked up as described in Example 1. The oily residue remaining after evaporation of the solvent is dissolved in a just sufficient amount of chloroform and is precipitated by the addition of hexane. The precipitate is twice recrystallized from benzene and is dried in a vacuum. The resulting 3-methyl androstan-3,17-diol begins to melt between 159°

C. and 161° C. and is molten to a clear liquid at about 164° C.

*Example 3*

On reacting 1 g. of androstan - 17β - ol - 3 - one with potassium acetylenide in 200 cc. of liquid ammonia, 0.8 g. of 3ξ-ethinyl androstan-3,17β-diol are obtained. Said product is a mixture of isomers and, therefore, has an unsharp melting point between 182° C. and 235° C. (The Greek letter ξ indicates that the ethinyl residue of the mixture of isomers formed thereby, is partly present in α- and partly in β-position). (Compare in this respect "Vorschlaege zur Nomenklatur der Steroide" [suggestions with regard to the nomenclature of steroids], Helvetica Chimica Acta vol. 34, page 1688/1951/).

*Example 4*

A solution of 6 g. of androstan-17α-ol-3-one-17-hexahydrobenzoate in 200 cc. of ether is gradually added to an ethereal solution of methyl magnesium iodide (obtained from 5.4 g. of magnesium, 16 cc. of methyl iodide, and 175 cc. of ether). The reaction mixture is then heated to boiling for 1½ hours, is cooled to about 5–10° C., and is decomposed by addition of 50 cc. of water and subsequently of 250 cc. of 7.5% hydrochloric acid. Any undissolved portion of the reaction product is brought into solution by the addition of ether. The ether extract is separated, washed with water, shaken with 10% sodium thiosulfate solution, and again washed with water. The washed ether extract is dried by means of sodium sulphate and vaporated to dryness. The resulting residue is recrystallized from benzene. The first crystalline fraction obtained thereby consists of 1.43 g. of crude 3b-methyl androstan-3a,17α-diol. It is obtained in a pure state by recrystallisation from methanol and has a melting point of 226–228° C.

The benzene mother liquor obtained thereby is subjected to a chromatographic treatment by allowing it to run through a column of aluminum oxide and eluting therefrom the reaction product by means of a mixture of benzene and methylenechloride on evaporating the solvent. 1.04 g. of 3a-methyl androstan-3b,17α-diol melting between 183–185–187° C., are obtained which are purified by recrystallisation from methanol. The pure compound has a melting point of 185–187° C.

3 g. 3b-methyl androstan-3a,17α-diol, obtained as described in this example, are dissolved in 240 cc. of glacial acetic acid. 9 cc. of an 8.5% chromic acid solution in 90% acetic acid are added thereto while stirring and maintaining the temperature between 18° C. and 20° C. Stirring at said temperature is continued for about 5 hours. Thereafter any excess of chromic acid present in the reaction mixture is destroyed by the addition of methanol and the reaction mixture is poured into 1000 cc. of water while stirring. The precipitated crude product is filtered off by suction and is washed until its reaction is neutral. Yield: 2.68 g. having a melting point of 181–184° C. The 3b-methyl androstan-3a-ol-17-one is recrystallized from a chloroform-hexane mixture and has a melting point of 185–186° C.

0.5 g. of 3b-methyl androstan-3a-17β-diol, as described in the examples, mixed with 1.5 cc. of pyridine and 1.5 cc. of acetic acid anhydride. The mixture is allowed to stand at room temperature for 24 hours. The reaction mixture is then poured into 50 cc. of ice water and is allowed to stand for several hours. The precipitated acetate is filtered off by suction. After recrystallisation for three times from acetic acid ethyl ester, the resulting pure 3b-methyl androstan-3a,17β-diol-17-acetate melts at 202–203° C.

The foregoing examples, for the purpose of clearly illustrating the invention, have been given in connection with the conversion of 3-keto compounds of the androstan and androsten series to compounds which have such antagonistic effect, by substituting a tertiary alcohol group in 3-position in place of a keto group. Steroid compounds, coming within this invention, correspond to the formula

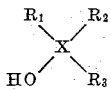

In said formula, X represents a steroid ring system substituted at least in 3-position by the groups

and in 17-position by the groups

R₁ in said compounds represents a saturated or unsaturated aliphatic hydrocarbon residue, R₂ hydrogen, R₃ is a hydroxyl group or a group convertible by hydrolysis into the hydroxyl group. R₂ and R₃ together may also represent a carbonyl oxygen atom. The ring system X may be saturated or unsaturated. It may contain other substituents, such as hydroxyl groups and/or keto groups or groups convertible thereinto by hydrolysis, for instance, ester or ether groups and the like.

These starting materials, in order to produce such new compounds, are treated according to any one of the Examples 1 to 4 above in which the amount of starting material is of equimolecular weight to the specific starting material mentioned in said examples. Especially useful reaction products are compounds which have a keto group in 17-position, such as 3 alkyl-3-hydroxy steroid-17-ketones, for instance, 3-methyl androstanol-3-one-17.

It is to be noted that steroid compounds which still possess the entire side chain of sterols in 17-position as well as steroid compounds which have two hydrogen atoms in said 17-position are not useful as antihormonal compounds and do not come within the claims of this invention.

Many other changes and variations may be made in the reaction conditions, the reaction temperature and duration, the solvents used, the reagents employed for converting the 3-keto group into a tertiary hydroxyl group, the methods of working up the reaction mixtures and of isolating the various reaction products and their isomers by those skilled in the art in accordance with the principles set forth herein and in the claims annexed thereto. The "antihormonal activity" referred to in column 1, which is exercised by the new compounds in a more or less significant manner is demonstrated by the following animal experiments:

Infantile male rats of approx. 30 g. body weight are treated with graduated doses of the substances under trial, to be administered daily for a period of 14 days. The minimum daily dose that suffices to still inhibit distinctly the growth of the testes of the treated animals in comparison with those of the untreated controls, is to be determined.

The result is shown in the following table:

| Substance | ° F. | Minimum daily dose |
|---|---|---|
| 3 a-methyl-androstan-3a-ol-17-one | 185–186 | 100γ |
| 3 b-methyl-androstan-3a-17β-diol | 194–195 | 100γ |
| 3 b-methyl-androstan-3a, 17α-diol | 226–228 | 1–10γ |
| 3 a-methyl-androstan-3b-ol-17-one | 147–148 | 1γ |

It is further stated that all 4 substances employed up to the maximum daily dose of 1000γ do not exercise direct androgen actions, measured by the weight of the seminal vesicle and prostate of the animals, nor have they any oestrus effect when administered in this dosage in a castrated female rat.

It is accepted that the new substances cause primarily a strong sexually non-specific inhibition of the gonadotrophic secretion of the pituitary. Secondarily, the absence of the gonadotrophic hormone brings about an inhibition of growth and function of the sexual glands.

We claim:

1. An androstane compound of the following formula:

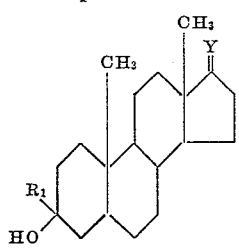

wherein $R_1$ is an aliphatic hydrocarbon radical with less than three carbon atoms, and wherein Y is a substituent selected from the group consisting of the

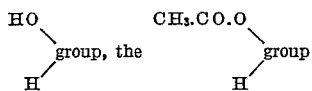

and oxygen.

2. 3-methyl androstan-3,17-diol compounds of the following formula

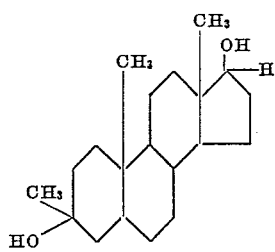

3. 3-methyl androstan-3,17β-diol having a melting point of about 194–195° C.

4. 3-methyl androstan-3,17α-diol having a melting point of about 266–228° C., said compound being soluble, on heating, in methanol.

5. 3-methyl androstan-3-ol-17-one compounds of the following formula

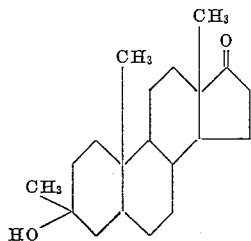

6. 3-methyl androstan-3-ol-17-one, having a melting point of about 147–148° C., said compound being soluble, on heating, in hexane.

7. 3-methyl androstan-3-ol-17-one having a melting point of about 185–186° C., said compound being highly soluble, on heating, in chloroform and sparingly in hexane.

8. 3-methyl androstan-3,17-diol-17-acetate of the following formula:

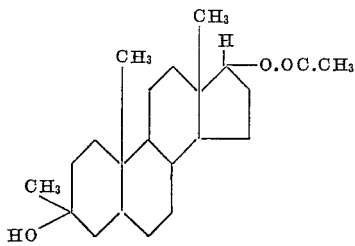

9. 3-methyl androstan-3,17-diol-17-acetate having a melting point of about 202–203° C., said compound being soluble, on heating, in acetic acid ethyl ester.

References Cited in the file of this patent

UNITED STATES PATENTS

| Number | Name | Date |
|---|---|---|
| 2,184,299 | Hildebrandt | Dec. 26, 1939 |
| 2,239,864 | Stavly | Apr. 29, 1941 |
| 2,243,887 | Serini | June 3, 1941 |
| 2,267,257 | Ruzicka | Dec. 23, 1941 |

OTHER REFERENCES

Ruzicka, Helv. Chim. Acta 30, 867–78 (1947).
Kumler, Jour. Am. Chem. Soc., 67, 1901–1906 (1945).